United States Patent
Kumar et al.

(10) Patent No.: US 7,640,545 B2
(45) Date of Patent: *Dec. 29, 2009

(54) TRANSACTION MANAGER FREEZING

(75) Inventors: Ajay Kumar, Bangalore (IN); Bala Dutt, Bangalore (IN); Venugopal Rao K, Kamataka (IN); Sankara R. Bhogi, Bangalore (IN); Srinivasan Kannan, Bangalore (IN)

(73) Assignee: Sun Microsytems, Inc., Santa Clara, CA (US)

( * ) Notice: Subject to any disclaimer, the term of this patent is extended or adjusted under 35 U.S.C. 154(b) by 1263 days.

This patent is subject to a terminal disclaimer.

(21) Appl. No.: 10/618,828

(22) Filed: Jul. 14, 2003

(65) Prior Publication Data

US 2005/0015425 A1 Jan. 20, 2005

(51) Int. Cl.
*G06F 9/46* (2006.01)
*G06F 7/00* (2006.01)
*G06Q 20/00* (2006.01)

(52) U.S. Cl. .............................. 718/101; 707/8; 705/70
(58) Field of Classification Search ................. 718/101, 718/106; 707/3, 8; 711/147; 705/40, 70
See application file for complete search history.

(56) References Cited

U.S. PATENT DOCUMENTS

| | | | |
|---|---|---|---|
| 4,502,116 A * | 2/1985 | Fowler et al. .................. 714/4 |
| 5,335,343 A | 8/1994 | Lampson et al. | |
| 5,488,694 A * | 1/1996 | McKee et al. .................. 710/4 |
| 5,504,899 A | 4/1996 | Raz | |
| 5,504,900 A | 4/1996 | Raz | |
| 5,586,312 A | 12/1996 | Johnson et al. | |
| 5,630,081 A | 5/1997 | Rybicki et al. | |
| 5,701,480 A | 12/1997 | Raz | |
| 5,781,912 A * | 7/1998 | Demers et al. .............. 707/202 |
| 5,795,228 A * | 8/1998 | Trumbull et al. .............. 463/42 |
| 5,983,225 A * | 11/1999 | Anfindsen ....................... 707/8 |
| 5,983,326 A * | 11/1999 | Hagersten et al. ........... 711/147 |
| 6,011,791 A | 1/2000 | Okada et al. | |
| 6,038,587 A | 3/2000 | Phillips et al. | |

(Continued)

OTHER PUBLICATIONS

Liu et al., "Designing a Test Suite for Empirically-based Middleware Performance Prediction," Australian Computer Society, Inc., (2002), ( 8 Pages).

(Continued)

*Primary Examiner*—Meng-Ai An
*Assistant Examiner*—Camquy Truong
(74) *Attorney, Agent, or Firm*—Robert C. Kowert; Meyertons, Hood, Kivlin, Kowert & Goetzel, P.C.

(57) ABSTRACT

A transaction manager may be paused so that the transactions it manages are prevented from making transaction state changes. While the transaction manager is paused, the transactions that the transaction manager is executing may not be allowed to complete. A transaction manager may be configured to obtain permission from a transaction freeze manager in order to transition the state of a transaction. The transaction freeze manager may function as a read/write lock manager controlling locks on a transaction freeze object. In servicing a transaction state transition request, the transaction freeze manager may grant the transaction manager a read lock on the transaction freeze object. In servicing a transaction manager pause request, the transaction freeze manager may grant an administrative entity a write lock on the transaction freeze object.

35 Claims, 10 Drawing Sheets

U.S. PATENT DOCUMENTS

| | | | |
|---|---|---|---|
| 6,041,354 A | | 3/2000 | Biliris et al. |
| 6,105,067 A | | 8/2000 | Batra |
| 6,154,787 A | | 11/2000 | Urevig et al. |
| 6,157,927 A | | 12/2000 | Schaefer et al. |
| 6,225,995 B1 | * | 5/2001 | Jacobs et al. ............... 715/738 |
| 6,233,587 B1 | | 5/2001 | Tandon |
| 6,243,737 B1 | | 6/2001 | Flanagan et al. |
| 6,272,675 B1 | | 8/2001 | Schrab et al. |
| 6,317,773 B1 | | 11/2001 | Cobb et al. |
| 6,338,112 B1 | | 1/2002 | Wipfel et al. |
| 6,374,243 B1 | | 4/2002 | Kobayashi et al. |
| 6,405,317 B1 | * | 6/2002 | Flenley et al. ............... 726/4 |
| 6,411,956 B1 | | 6/2002 | Ng |
| 6,421,661 B1 | * | 7/2002 | Doan et al. ............... 707/3 |
| 6,421,688 B1 | | 7/2002 | Song |
| 6,442,618 B1 | | 8/2002 | Phillips et al. |
| 6,496,828 B1 | | 12/2002 | Cochrane et al. |
| 6,519,679 B2 | | 2/2003 | Devireddy et al. |
| 6,687,729 B1 | | 2/2004 | Sievert et al. |
| 6,687,831 B1 | | 2/2004 | Albaugh et al. |
| 6,704,737 B1 | | 3/2004 | Nixon et al. |
| 6,728,958 B1 | * | 4/2004 | Klein et al. ............... 718/101 |
| 6,832,238 B1 | | 12/2004 | Sharma et al. |
| 6,854,646 B2 | | 2/2005 | Ieshima et al. |
| 6,862,573 B2 | | 3/2005 | Kendall et al. |
| 6,873,995 B2 | | 3/2005 | Benson et al. |
| 6,950,848 B1 | | 9/2005 | Yousefizadeh |
| 6,981,221 B2 | | 12/2005 | Neudeck |
| 7,065,563 B2 | | 6/2006 | Islam et al. |
| 7,080,119 B2 | | 7/2006 | Felt et al. |
| 7,082,432 B2 | | 7/2006 | Bhogi et al. |
| 7,089,566 B1 | | 8/2006 | Johnson |
| 7,134,008 B2 | | 11/2006 | Dutt et al. |
| 7,165,061 B2 | | 1/2007 | K et al. |
| 2001/0037315 A1 | * | 11/2001 | Saliba et al. ............... 705/70 |
| 2002/0124083 A1 | | 9/2002 | Jeyaraman et al. |
| 2002/0194244 A1 | * | 12/2002 | Raventos ............... 709/101 |
| 2003/0036919 A1 | | 2/2003 | Felt et al. |
| 2003/0046342 A1 | | 3/2003 | Felt et al. |
| 2003/0055968 A1 | | 3/2003 | Hochmuth et al. |
| 2003/0182459 A1 | | 9/2003 | Jeyaraman et al. |
| 2004/0030739 A1 | | 2/2004 | Yousefizadeh |
| 2004/0088413 A1 | | 5/2004 | Bhogi et al. |
| 2004/0153349 A1 | | 8/2004 | K. et al. |
| 2004/0153383 A1 | | 8/2004 | K. et al. |
| 2004/0153450 A1 | | 8/2004 | K. et al. |
| 2004/0172385 A1 | * | 9/2004 | Dayal ............... 707/3 |
| 2004/0215473 A1 | | 10/2004 | Bhogi et al. |
| 2004/0215894 A1 | | 10/2004 | Bhogi et al. |
| 2004/0216109 A1 | | 10/2004 | Bhogi et al. |
| 2005/0015353 A1 | | 1/2005 | Kumar et al. |
| 2005/0055325 A1 | | 3/2005 | Dutt et al. |
| 2005/0066155 A1 | | 3/2005 | Dutt et al. |

OTHER PUBLICATIONS

"Java™ 2SDK, Enterprise Edition 1.3.1 Configuration Guide," j2ee/sdk_1.3/techdocs/release/ConfigGuide.html, Jan. 3, 2002, (16 Pages).

Ellis et al., :JDBC ™ 3.0 Specification—Final Release, Sun Microsystems, Inc., Oct. 2001, (190 pages).

"iPlanet Application Server 6.0 Administration Guide: Chapter 4 Logging Server Messages," /source/816-5720-10/adlog.htm, Sep. 5, 2000, (21 Pages).

"JDBC ™ Data Access API—The JDBC API Universal Data Acess for the Enterprise," java.sun.com, Aug. 10, 2003, (5 Pages).

"Connection Pooling," Advanced Programming for the Java 2 Platform, Aug. 16, 2002, (4 Pages).

Siva Visveswaram, "Manage Access to Shared, Server-Side Resources for High Performance—Dive Into Connection Pooling with J2EE," JavaWorld, Oct. 2000, (8 Pages).

"Interface DataSource," DataSource (Java 2 Platform, SE v1.4.1), 2002, (1 Page).

"Initial Context," JNDI 1.2.1 Specification: Class Initial Context, /products/jndi/1.2/javadoc/javax/naming/InitialContext.html, Jul. 14, 1999, (1 Page).

JNDI—Java ™ Naming & Directory Interface ™, Sun Microsystems, Inc., /jndi, May 15, 2003, (2 Pages).

"Planet Application Server 6.0 Administration Guide: Chapter 9 Adminstering Transactions," /source/816-5784-10/adtrans.htm, Sep. 5, 2000, (11 Pages).

Breitbart et al., "Replication and Consistency Being Lazy Helps Sometimes," PODS '97, Jun. 1997, (pp. 173-184).

Patricia Serrano-Alvarado et al."Mobile Transaction Supports for DBMS". In 17ièmes Journées Bases de Données Avancées, Agadir, Maroc, Oct. 2001, (19 Pages).

Efficient and Flexible Methods for Transient Versioning of Records to Avoid Locking by Read-Only Transactions, 1992 ACM SIGMOD, Jun. 1992, (pp. 124-133).

BEA WebLogic Enterprise 5.1, BEA Systems, Inc., 2000, (13 Pages).

"Simplified Guide to the Java TM 2 Platform Enterprise Edition," Sun Microsystems, Inc., 1999, (13 Pages).

Dogac et al., "METU Interoperable Database System," Demo Description, In Proc. Of ACM Sigmod Intl. Conf. On Management of Data, Jun. 1996, (6 Pages).

Oracle9i JDBC Developer's Guide and Reference (Mar. 2002, retrieved from standford.edu/dept/itss/docs/oracle/9i/java.920/a96654/toc.htm on Sep. 6, 2005).

Kannegaard (J2EE BluePrints, Mar. 20, 2000 retrieved from java.sun.com/blueprints/guidelines/designing_enterprise_applications/apmTOC.html on Sep. 6, 2005).

Manolis Marazakis, "Distributed Systems," University of Crepe, Sep. 2002, pp. 1-31.

* cited by examiner

TRANSACTION MANAGER FREEZING

BACKGROUND OF THE INVENTION

1. Field of the Invention

The invention relates to computer systems and computer software, and more particularly to transaction management in computer systems.

2. Description of the Related Art

Large business systems may include application servers that run multiple applications and/or multiple copies of the same application concurrently. Some or all of these applications may be transaction oriented and may be capable of conducting many transactions simultaneously. Given the potentially large number of data sources, network nodes, transmission devices, etc. involved in multiple, simultaneous transactions, many different types of errors may occur that may interfere with successful transaction completion. Some of these errors may be automatically detectable/correctable by the hardware and software components of the system. For example, a message may become garbled while traversing a network segment and the receiving node may automatically request the message be retransmitted. In another instance, a backend system participating in a global transaction may crash before committing its transaction branch. In this case the manager of the transaction may retain the status of the transaction until the failed backend system is back online. The failed system may request the status of the transaction from the transaction manager and commit the results of its transaction branch. At this point the transaction manager may log the transaction status as completed.

In other cases the detection and correction of errors may require various degrees of manual intervention. A system administrator or administrative program associated with an application server may have access to real time data being logged by a transaction manager. Through examination of transaction logs, the administrator may observe undesirable or erroneous transaction results. For example, a malicious user may attempt to perform transactions with the goal of producing unintended results for the benefit of the user and/or detriment of the vendor. This may include gaining access to unauthorized information, altering account balances or other information stored in a database, and degrading the performance of the vendor's system among numerous other possible effects. Not all instances of transactions producing detrimental effects are the result of maliciousness. Given a large enough pool of users, a certain number of well-intentioned transaction attempts will produce unintended results due solely to the inability of the application program to anticipate all possible user interactions and provide for proper responsive actions.

While monitoring data from transaction logs, an application server administrator may discover anomalous behavior and/or results associated with one or more transactions being executed by a transaction manager. At this point, even though the erroneous transactions may represent only a small fraction of the total number of transactions being processed by the application server, the administrator may be compelled to take remedial action to prevent database corruption or other serious system degradation. Typically such administrative intervention may require taking the application server offline thereby disrupting all transactions in progress and rendering all functions provided by the server unavailable for some period of time. This disruption of service may be extremely inconvenient for users as well as costly for the vendor whose application is now unable to process transactions.

SUMMARY

A transaction manager may be paused so that transactions managed by the transaction manager are prevented from making transactional state changes. When all transactions being coordinated by a transaction manager are paused, the transaction manager may be said to be paused or frozen. While the transaction manager is paused, the transactions that the transaction manager is supporting may not be allowed to complete. A transaction manager may be configured to obtain permission from a transaction freeze manager in order to transition the state of a transaction. The transaction freeze manager may function as a read/write lock manager controlling locks on a transaction freeze object. In servicing a transaction state transition request, the transaction freeze manager may grant the transaction manager a read lock on the transaction freeze object. In servicing a transaction manager pause request, the transaction freeze manager may grant an administrative entity a write lock on the transaction freeze object.

The transaction manager may request permission to change the state of a transaction any time a transaction is ready to make a state transition. For example in the case of a global transaction, when an application initiates a transaction, the transaction manager may request permission to change the state of the transaction from the nonexistent state to the active state. When the application executes a commit command, the transaction manager may request permission to change the state of the transaction from the active state to the preparing state. Upon receiving responses from all transaction participants indicating that they are prepared to commit the transaction, the transaction manager may request permission to change the state of the transaction from the preparing state to the committing state. Upon receiving responses from all transaction participants indicating that they have committed the transaction, the transaction manager may request permission to change the state of the transaction from the committing state to the nonexistent state.

While the transaction manager is frozen no transaction may change state, however, the transaction manager may continue to support the execution of transactions within their current state. For example, if a transaction is in the preparing state when the transaction manager is paused, the transaction manager may continue to receive responses to the commitment readiness query. When affirmative responses are received from all participants, the transaction manager may request permission to change the state, of the transaction to the committing state, but this permission may be withheld because the transaction manager is in paused mode., While the transaction manager is paused, the computer system may continue normal execution of applications and other system components not utilizing the transaction manager. Applications executing transactions may continue to function normally for the most part, but may encounter delay when the transaction requires a change of state. Components of the system may receive and execute operations on one or more individual transactions during this time. These operations may include one or more of the following: rollback, abort, partial rollback, add/remove participant, and commit. For example, if the transaction manager is paused due to the detection of erroneous transaction behavior, a system component may receive requests to rollback or abort one or more transactions in order to correct the state of one or more of the participating databases.

In some embodiments, pausing and resuming the transaction manager may be a function of one or more administrative programs executing as components of the computer system.

Alternatively this function may reside with a human system administrator who may issue pause and resume commands through a user interface.

The facility to pause and resume a transaction manager may reside in one or more computer systems executing one or more application servers. The computer systems running application servers may be coupled among themselves as well as coupled to various other end user systems and backend systems through one or more networks or network segments. An exemplary network of this type may be the Internet. Administrative entities within this networked computer system may pause and resume one or more transaction managers in response to the detection of anomalous transaction behavior.

Figure 1:
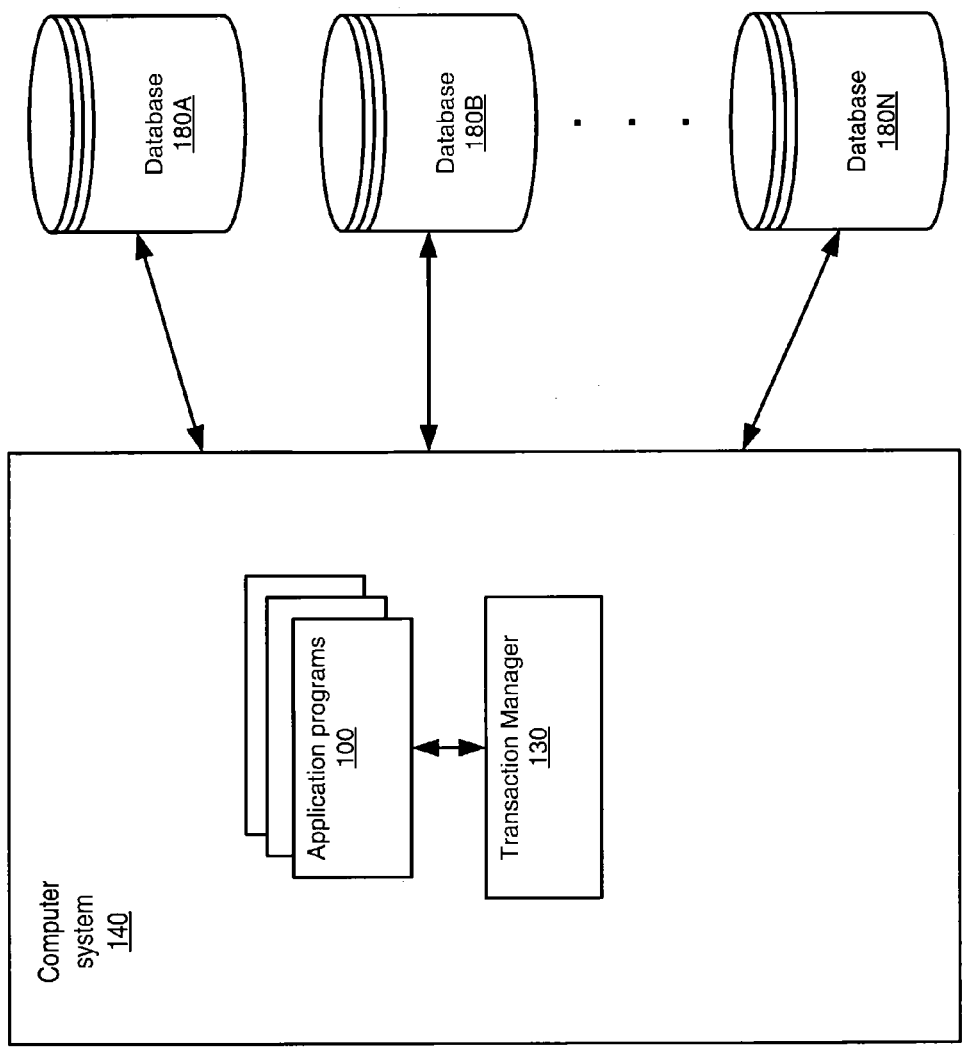
FIG. 1 shows an embodiment of a computer system including a transaction manager along with one or more applications.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

FIG. 1 illustrates a computer system 140, according to one embodiment. The computer system may be configured to execute software including one or more application programs 100. Application programs 100 may read and/or modify data stored in one or more databases 180. Databases 180 may also be referred to as data sources. An example of such an application 100 may be a banking application that may query and update account information stored in a banking database. In another embodiment, the application may be an Internet business application providing electronic sales for a vendor, and interacting with several of the vendor's databases.

Some application programs may require that the results of sets of database operations must be committed to permanent storage atomically, that is either all together or not at all, in order for the data to remain consistent and to maintain data integrity. Such a set of operations may be referred to as a transaction. An example of an application in which a transaction may be beneficial is a banking application in which funds are transferred from one account to another. The application may accomplish the transfer by performing a withdrawal from one account and a deposit to another account. If the withdrawal operation completes but the deposit operation does not, the first account may reflect and improper balance. Conversely, if the deposit operation completes, but the withdrawal fails, the second account may show an improper balance. In the case of such a set of interdependent operations, neither the withdrawal nor the deposit should complete unless both can complete. By including both the withdrawal and deposit operations in a transaction, the application may designate that the operations are required to complete atomically.

An application may designate operations to be included in a transaction by including a statement to initiate a transaction, designating an identity for the transaction, and concluding the operations included in the transactions with a command to commit the database operations to permanent storage.

In some embodiments, the initiation of a transaction may result in the instantiation of a transaction object. The transaction object may include a unique identity for the transaction. Subsequent to transaction initiation, an application may require interaction with one or more databases within the scope of the transaction. Each time the application interacts with a database 180 for the first time, a connection may be established between the application and the database. The connection may be used to send the transaction object to the database 180.

Upon receiving the transaction object, the resource manager associated with the database 180 may use an enlistment method included with the transaction object to enlist as a transaction participant with transaction manager 130. Transaction manager 130 may enlist each participant in a transaction in order to notify all participants of changes in the state of the transaction. Transactions in which only one database is accessed may be referred to as local transactions. Transactions in which more than one database is accessed may be referred to as global transactions.

The transaction manager may be configured to pause transactions in progress. This pausing of transaction manager function may be referred to as freezing the transaction manager. In one embodiment, while the transaction manager is frozen, transactions may progress within a single state, but may not be allowed to transition to a subsequent state. In some embodiments, other functions of the computer system not using the transaction manager may proceed normally while the transaction manager is paused. The transaction manager may be resumed maintaining continuity of transactions and restoring normal operation to functions using the transaction manager.

A system administrator or administrative application may pause the transaction manager in response to detecting anomalous transaction behavior. For example, transaction log entries may indicate that a certain type of transaction is resulting in erroneous data being written to a particular database. An administrative entity may issue a pause request to the transaction freeze manager, thereby pausing the transaction manager. While the transaction manager is paused, the administrative entity may issue commands to modify one or more individual transactions in order to correct errors and/or prevent system degradation. These commands may result in one or more transactions being aborted, rolled back, partially rolled back, or committed. During this intervention, non-transactional aspects of applications running on the server may continue to function normally. After necessary corrective actions have been taken, the function of the transaction manager may be resumed, and all remaining paused transactions may complete as usual.

Figure 2:
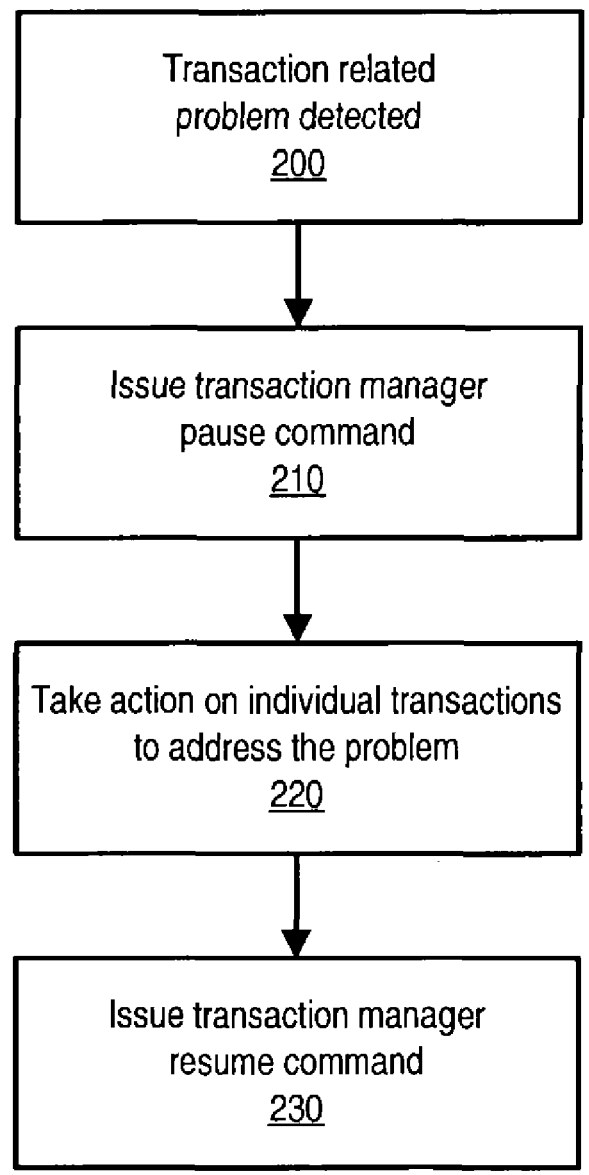
FIG. 2 is a flowchart of a method for administrating an application server with a transaction manager that can be paused, according to one embodiment.

FIG. 2 is a flowchart of a method for administrative pausing and resuming of a transaction manager according to one embodiment. At block 200, an administrative entity may discover evidence of some transaction-related problem. For example, the administrator may note several transactions in which a purchaser ordered one quantity of a certain item but the corresponding inventory database indicates a decrement of a different quantity after the transactions committed.

This discovery may prompt the administrative entity to issue a command to pause the transaction manager as shown at 210. In one embodiment, a human administrator may issue a command to pause the transaction manager through an I/O device associated with a system monitoring station. In another instance, the checking of transaction logs may be an automated function and an administrative application may issue a request to pause the transaction manager. Once state transitions of currently executing transactions have been halted, the administrator may take corrective actions as illustrated at 220. For example, the administrator may roll back or abort one or more currently executing individual transactions that may result in further data corruption. Further, the administrator may issue commands to preclude the initiation of subsequent transactions that would likely result in errors. For example, if all the problematic transactions were initiated by a specific application or application component, the administrator may issue commands to prohibit the execution of that function. Once the administrator has taken appropriate remedial action, he may issue a command to resume the transaction manager as shown in block 230.

Figure 3:
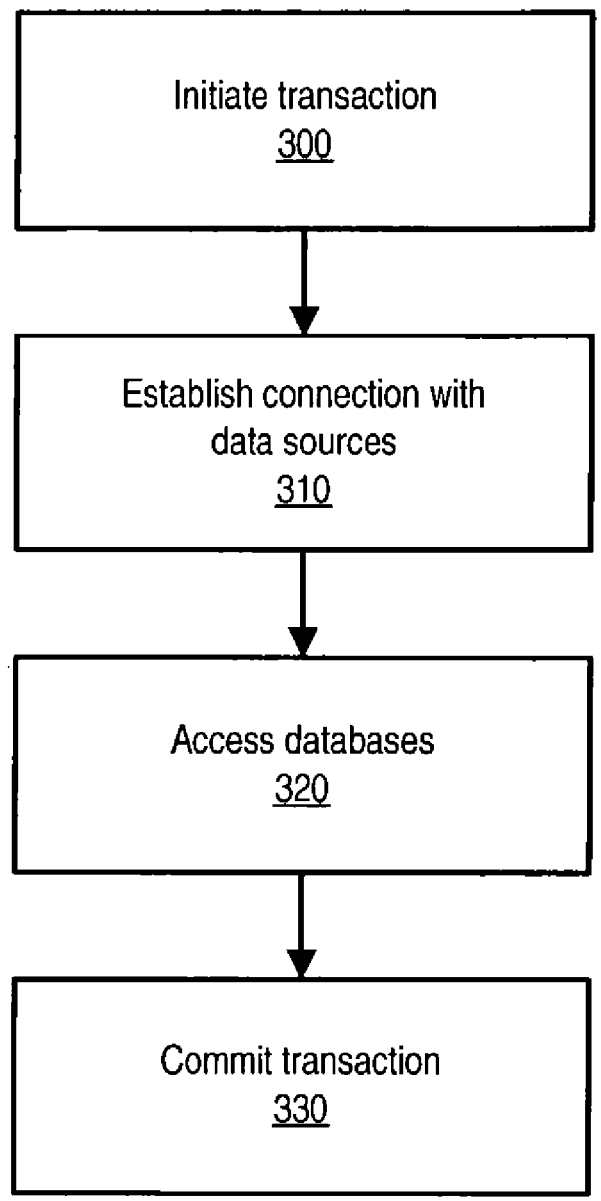
FIG. 3 is a flow chart for a method of operating an application including transactions, according to one embodiment.

FIG. 3 is a flow chart for a method of operating an application including transactions, according to one embodiment. At 300 the application may reach a point where it needs to perform atomic operations involving one or more data sources and initiate a transaction. The application may establish connections with one or more data sources, as shown in block 310 and access one or more databases associated with the data sources at 320. An example of such interaction may be found in a shopping application. The application may allow a customer to select potential purchases from products offered by several vendors. Each time the customer adds an item from a particular vendor to his shopping cart, the application may establish a connection to that vendor's inventory database to decrement a quantity available field. The customer may add and remove items from his list of potential purchases any number of times during the shopping process requiring multiple accesses to multiple data source. At some point the customer may decide to complete his purchase. The application may then commit the transaction as illustrated by block 330. Committing the transaction may cause the results of the transaction's database alterations to be made permanent.

Figure 4:
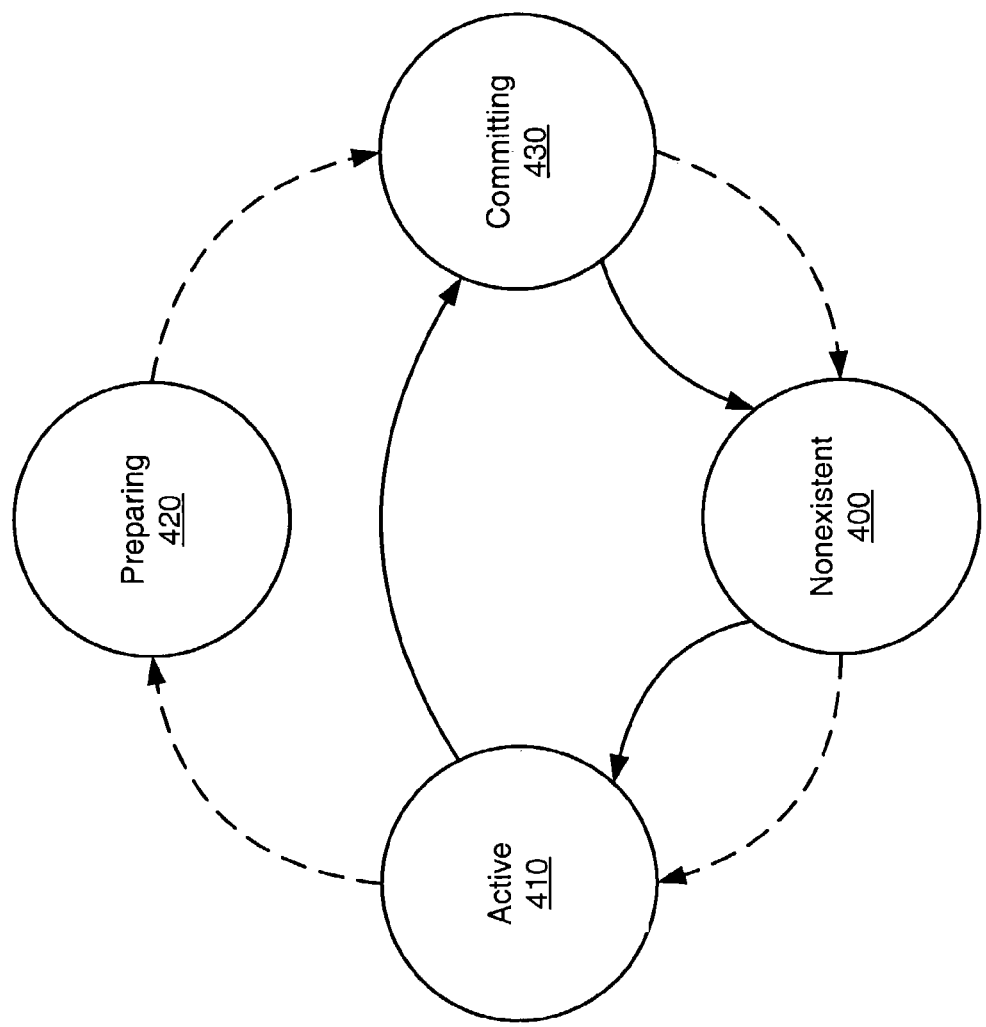
FIG. 4 is a state transition diagram for local and global transactions, according to one embodiment.

FIG. 4 illustrates the states and state transitions associated with local and global transactions, according to one embodiment. In FIG. 4, state transitions for local transactions are represented by solid lines, while those for global transactions are represented by broken lines. The state transition flow for the global transaction follows the flow for a local transaction with the addition of the preparing state 420 between the active state 410 and the committing state 430.

A local transaction may have three states and three associated state transitions. In the non-existent state 400, no resources may be allocated to the transaction. The initiation of a transaction by an application may be a transition of the transaction from the non-existent state to the active state 410. In active state 410, the application may communicate with the database to read and/or write one or more units of data stored therein. At some point during the execution of a transaction, the application may decide to make permanent the alterations to the database that it has been processing. This may result in a change of state of the transaction from the active state 410 to the committing state 430. In committing state 430, the resource manager may lock all or part of the database and write changes that accumulated during the active state of the transaction. When the database reports that it has successfully committed all changes, the resources associated with the transaction may be released, returning the transaction to the nonexistent state 400.

The states and state transitions for a global transaction may be similar to those for a local transaction with the exception of one additional state and transition. The number of database participants in a global transaction may be large. In order to insure atomicity for a global transaction, the transaction manager may employ a two-phase commit protocol for permanently updating the databases. Under a two-phase commit protocol, when the application executes the commit command to permanently alter the contents of the participant databases, the transaction manager may change the state of the transaction from the active state 410 to the preparing state 420. In the preparing state 420, the transaction manager may query each data source participating in the transaction to determine whether or not it is prepared to permanently commit the changes accumulated during the active portion of the transaction to the associated database. When all transaction participants respond that they are prepared to commit the transaction, the transaction manager may change the state of the transaction to the committing state 430.

Figure 6:
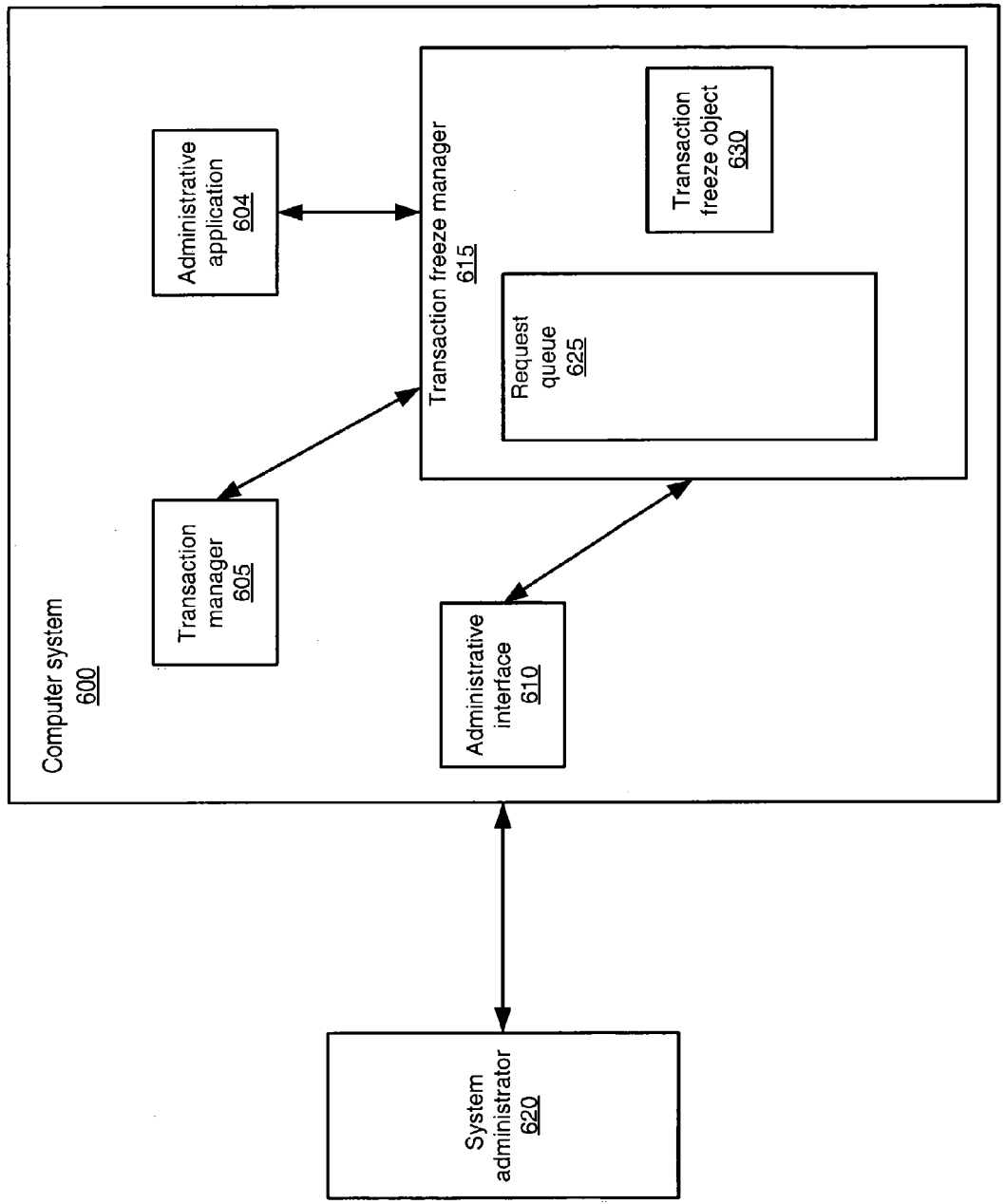
FIG. 6 shows administrative components of a computer system, according to one embodiment.

In some embodiments, the transaction manager may request transition permission from a transaction freeze manager prior to changing the state of a transaction from one state to the next. A transaction freeze manager and associated components are illustrated in FIG. 6, and will be described in greater detail below. By withholding transition permission for a transaction, the transaction freeze manager may effectively pause the transaction. By withholding transition permission for all transactions being coordinated by a transaction manager, the transaction freeze manager may effectively pause the transaction manager. Note that in some embodiments the transaction freeze manager may be part of the transaction manager.

Figure 5:
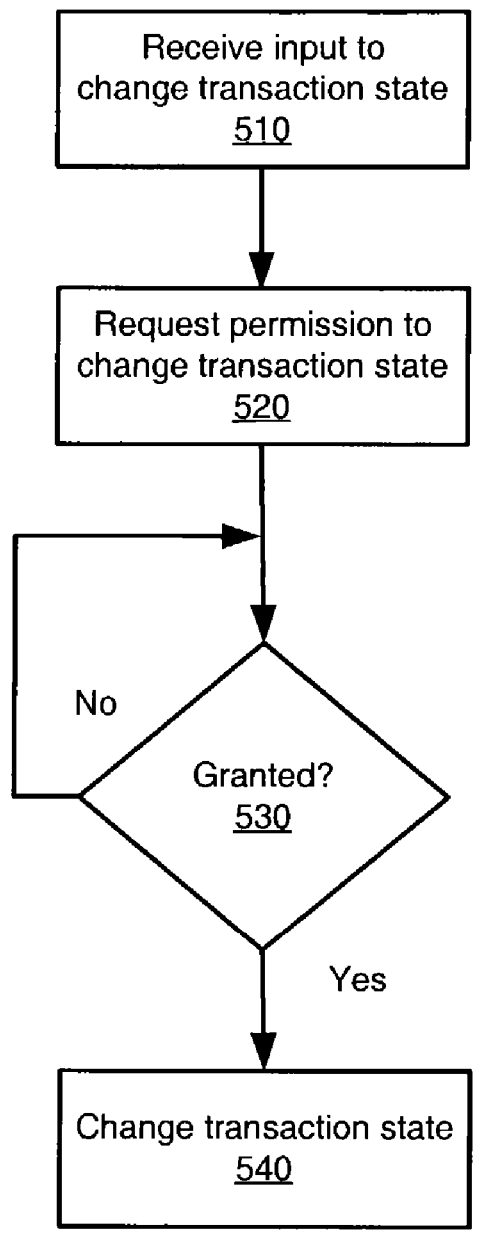
FIG. 5 is a flowchart of a method for operating a transaction manager, according to one embodiment.

FIG. 5 is a flowchart of a method of operating a transaction manager, according to one embodiment. At 510 the transaction manager may receive input to change the state of a transaction. For example, the transaction manger may receive and indication that an application has executed a commit command for a transaction. If the transaction is local, the transaction manager may need to change the state of the transaction to the committing phase, whereas in the case of a global transaction, the transaction manager may need to change the state of the transaction to the preparing phase.

Any time the transaction manager needs to change the state of a transaction from one state to another, it may request transition permission from a transaction freeze manager, as shown at block 520. Once the transaction manager has requested phase transition permission for a particular transaction, it may wait until such permission is granted before continuing the processing of the transaction, as indicated in block 530. It is this wait for permission to change the state of transactions that may allow the transaction freeze manager to pause the function of the transaction manager. In some embodiments, a transaction may be suspended at 530 for as long as state transition permission is withheld. In other embodiments, the transaction manager may only be paused for a definite time interval derived from transaction protocol timers running in the application computer system and participant computer systems. If the transaction is paused for too long, the participants may abort the transaction due to the expiration of their timers. When a resume transaction manager request is received, permission to change the state of a transaction may be granted, and at block 540, the transaction manager may proceed with the execution of the transaction.

FIG. 6 illustrates administrative components of computer system software including a transaction freeze manager 615, according to one embodiment. The transaction freeze manager 615 may receive requests from the transaction manager 605 as well as administrative applications running on computer system 600. Administrative entities may include one or more administrative applications 604 as well as a human system administrator 620 in some cases. The system administrator may submit requests to the transaction freeze manager through administrative interface 610.

Transaction freeze manager 615 may receive transaction transition requests from transaction manager 605 and transaction manger pause requests from administrative entities 604 and 620. Transaction freeze manager 615 may store the received requests in request queue 625 in the order in which the requests are received. In some embodiments, transaction freeze manager 615 may service queued requests in a manner analogous to the servicing of read and write lock requests by a read/write lock manager. In these embodiments, transaction freeze manager 615 may supervise the locking of transaction freeze object 630.

Figure 7:
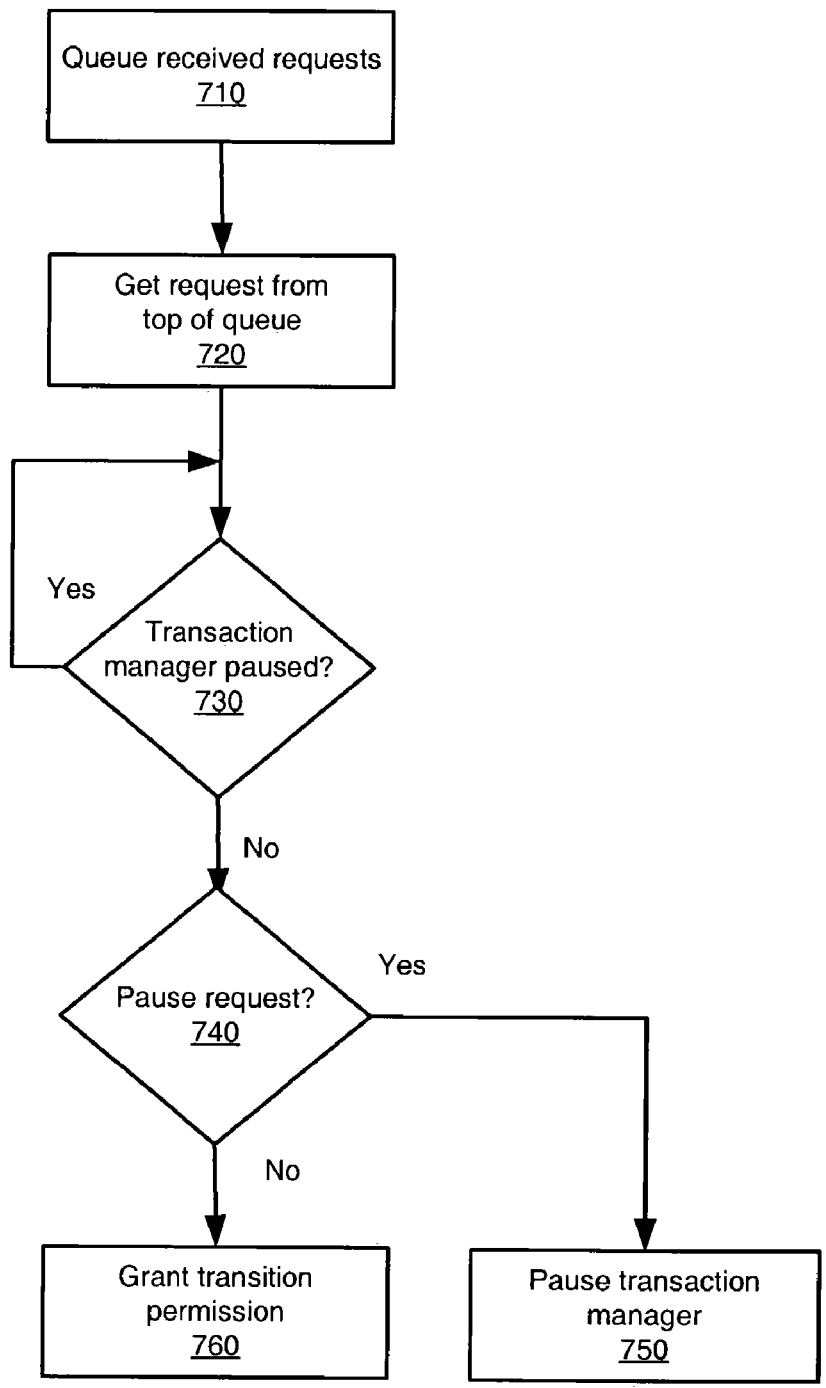
FIG. 7 is a flowchart of a method for operating a transaction freeze manager, according to one embodiment.

FIG. 7 is a flow chart for a method of operating a transaction freeze manager, according to one embodiment. As requests are received, they may be queued in the order in which they are received, as shown at 710. Queued requests may be serviced in FIFO order as illustrated in block 720. While the transaction manager is paused, no requests may be serviced, as shown at decision block 730. When the transaction manager is unfrozen, at decision block 740 the request may be classified as to whether it is a transaction state transition permission request or a transaction manager pause request.

Any number of requests for transaction state transition permission may be granted concurrently. Therefore, once such a request has been identified at 740, permission may be granted as shown at block 760. In some embodiments, transaction state transitions may complete in a negligible amount of time. In such embodiments, a request to pause the transaction manager, identified at decision block 740, may be granted immediately, as shown at block 750.

In other embodiments, transaction state transitions may be of non-negligible duration. In these embodiments, the transaction freeze manager may function as a read/write lock operating on a transaction freeze object.

Under a read/write locking method, two levels of locking may be implemented. The first level or read lock may be non-exclusive in that more than one entity may acquire a read lock for the same resource concurrently as long as no write lock has been granted. A request for transaction state transition permission may be implemented as a request for a read lock on the transaction freeze object. The transaction manager may not be allowed to proceed with a transaction state transition until it receives a read lock on the transaction freeze object.

The second level or write lock is exclusive in that once a write lock is granted, no other write lock or read lock may be granted until the write lock is released. Further, a write lock may not be granted if there are any outstanding locks of either type. A request to pause the transaction manager may be implemented as a request for a write lock on the transaction freeze object. Thus, a transition manager pause request may have to wait for previously permitted transaction state transitions to complete, and all requests may wait while the transaction manager is paused.

When the transaction manager issues a request to transition the state of a transaction, the transaction freeze manager may service this request as a request for a read lock on a transaction freeze object. If the transaction manager is not frozen, i.e. no outstanding write lock, then the transaction freeze manager may grant the transaction manager permission to transition the state of the transaction in the form of a read lock on the transaction freeze object. The read lock may be granted regardless of any other outstanding read locks.

When an administrative entity, system administrator or administrative application, issues a request to pause the transaction manager, the transaction freeze manager may service this request as a request for a write lock on a transaction freeze object. If the transaction manager is not already frozen, and there are no incomplete transaction state transitions, i.e. outstanding read locks, the transaction freeze manager may grant a write lock on the transaction freeze object. This may have the effect of pausing the transaction manager because no read locks, i.e. transaction state transitions, may be allowed until the write lock is released.

Figure 8:
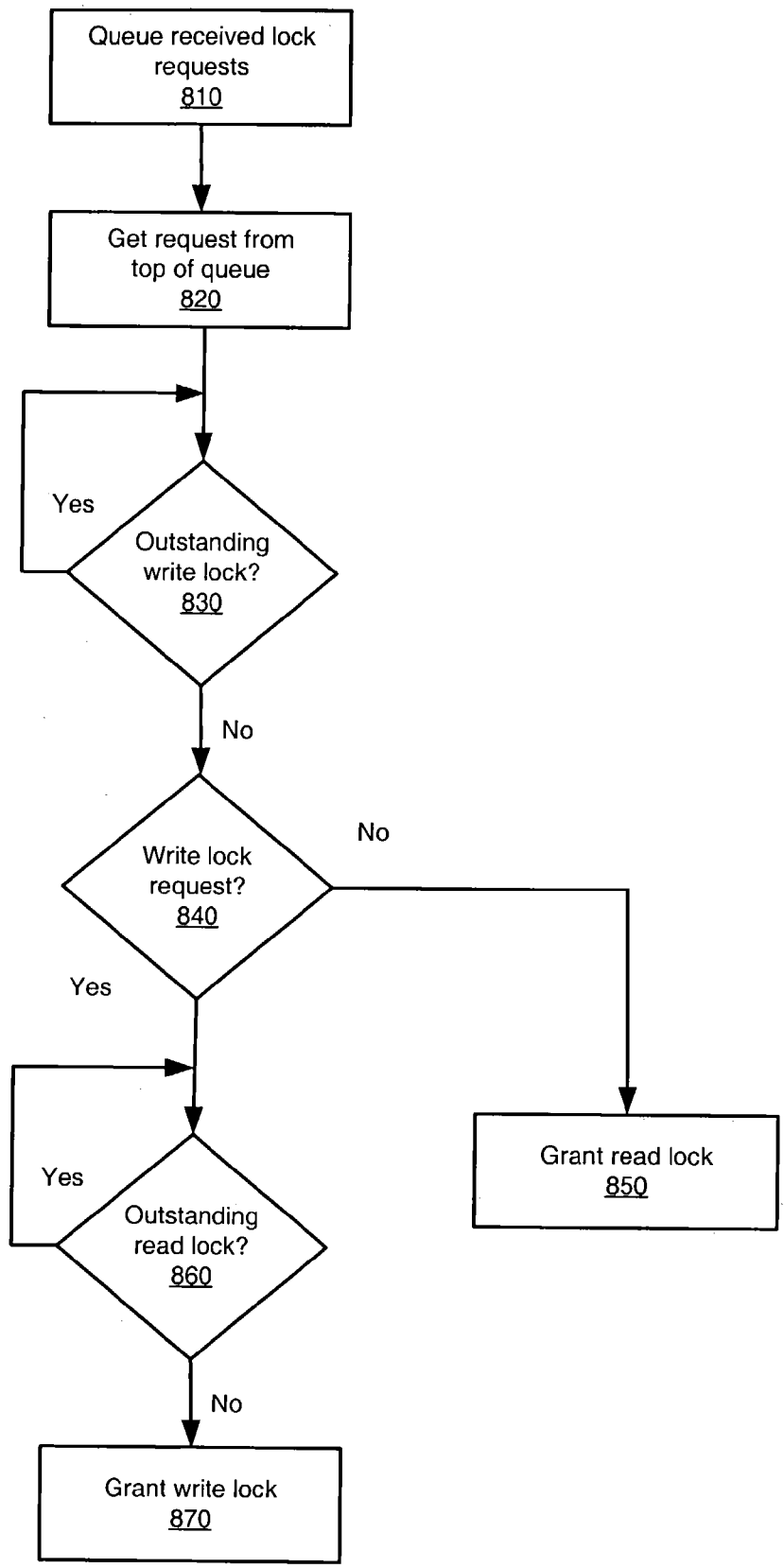
FIG. 8 is a flowchart of a method for operating a transaction freeze manager as a read/write lock, according to one embodiment.

FIG. 8 is a flowchart for a method for transaction manager freezing employing a read/write lock manager according to one embodiment. At 810, lock requests may be queued in the order in which they are received. Lock requests may be serviced in FIFO order where the oldest queued request may always be the next request to be serviced as shown at 820. In decision block 830, if a write lock on the transaction freeze object has been granted thereby pausing the transaction manager, no other lock requests may be serviced until the write lock has been released.

If the transaction manager is unfrozen, i.e. no outstanding write lock, it may be determined at decision block 840 that the request is for a read lock on the transaction freeze object in order to change the state of a transaction. The read lock request may be granted at 850 without further analysis, as any number of read locks may be in effect concurrently. If the request is for a write lock to pause the transaction manager however, a check may be made at decision block 860 to determine whether there, are any outstanding read locks, i.e. whether all granted transaction state changes have completed. If outstanding read locks exist, the lock manager may wait for all transaction state changes to complete before granting the write lock thereby pausing the transaction manager at block 870.

Figure 9:
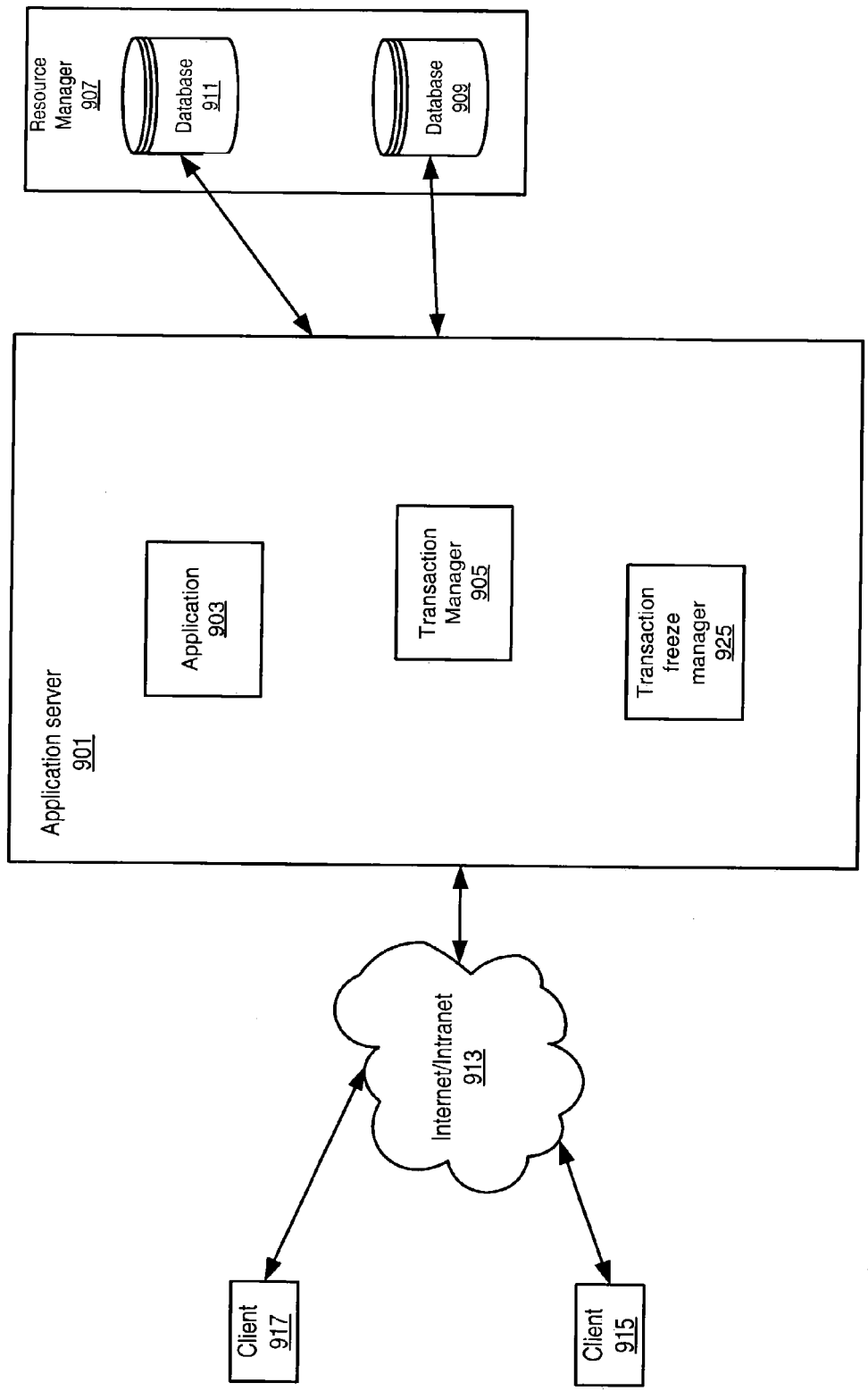
FIG. 9 illustrates the components of a three tier networked computer system, according to one embodiment.

In some embodiments, a transaction manager with pause capability may be included as a component of an application server in a networked computer system, as illustrated in FIG. 9. A networked computer system may support the execution of three-tier applications. A three-tier application is an application that may be organized into three major parts, each of which may be distributed within a networked computer system. The three parts (tiers) may include: one or more clients 915 or 917, one or more servers 901, and one or more back-end systems (e.g. databases 909 or 911) along with their management functions 907. In the first tier, a client may be a program running on a user's computer that includes a graphical user interface, application-specific entry forms, and/or interactive windows for interacting with an application. An exemplary client may be a web browser that allows a user to access the Internet. In the second tier, a server may be a program such as an application server that contains the business logic for an application such as banking transactions or purchasing merchandise for the user of a client. The server may be running on one or more computers.

A plurality of client systems may connect to one or more servers as components of a network 913. An exemplary network of this type is the Internet. Clients may submit various types of requests to servers. Often the server may be able to fulfill the client's request using only resources internal to the server system. In other instances, resources external to the server may need to be accessed in order to provide the requested service. This type of request may require the establishment of a connection between the server and a backend system including one or more databases 909 or 911 and corresponding resource managers 907. A connection may be a set of computer system resources and parameters, which allows communications between two or more entities within the system.

The third tier of a three-tier application may include one or more backend systems. A backend system may include one or more databases 911 and programs that facilitate access to the data they contain. Databases on backend systems may be referred to as data sources. In order to perform a particular function, an application 903 may need to retrieve and/or alter data in multiple databases resident on multiple backend systems. A set of two or more related operations that must be coordinated together atomically may be referred to as a transaction. A transaction involving more than one data source may be referred to as a distributed or global transaction.

An example of a global transaction is a customer purchasing a product via the Internet. A customer may use the web browser component of a client 917 to browse web sites stored on multiple application servers coupled to the client system through the Internet. When the customer begins browsing a vendor's web site, and application may initiate a transaction to coordinate all web site activities associated with that customer. The transaction manager may request permission from the transaction freeze manager to change the state of the transaction to the active state and when permission is granted, begin enlisting participants.

While the transaction is in the active state, the customer may exercise options offered by the application. For example, if the customer is shopping for travel arrangements, the application may offer the option of comparing rates among several airlines. To obtain the necessary pricing information, the application 903 may need to establish connections with, and obtain flight data from databases 909 belonging to multiple airline companies.

As the application 903 accesses a new data source, the resource manager 907 associated with the data source may enlist with the transaction manager 105 running on application server 901. Transaction manager 905 may then be responsible for communicating changes in the state of the transaction to all enlisted participants. As the customer progresses through his selection process, he may request many other types of information relevant to the offered flights requiring the application to access other data sources. For example, the customer may request comparative cost data for flights leaving on various days or at various times of the day in order to find the lowest priced option.

As the customer makes selections offered by the travel application, the participating data sources may alter/update copies of data from associated databases. If the customer should abandon his search before making a purchase, the application 903 may instruct the transaction manager 905 to roll back the transaction. The transaction manager 905 may issue a roll back command to all participants enlisted in the transaction. Upon receiving a roll back command, each transaction participant may discard the altered copies of data associated with the transaction. In this way, the integrity of the participating databases may be maintained.

Once the customer has made his selection and supplied the information necessary to make the purchase, the application 903 may issue a command to commit the transaction. Since the transaction involves multiple data sources, transaction manager 905 may use a two-phase commit protocol to insure transaction atomicity. Transaction manager 905 may request permission form transaction freeze manager 925 to change the state of the global transaction from the active state to the preparing state. If the transaction manager is not paused, the transaction freeze manager 925 may grant permission for the transition. Transaction manager 905 may query each participant data source as to whether the resource manager 907 is prepared to commit the accumulated changes associated with the transaction to the database 911.

Upon receiving affirmative responses from all participants, transaction manager 905 may request permission to change the state of the transaction to the committing state. With the receipt of transition permission, the transaction manager 905 may send a commit command to the resource manager 907 of all participating data sources. In response to the commit command, the resource manager 907 may write the altered data associated with the transaction to the corresponding database 911 and send a completed response to the transaction manager 905. When all participants have responded that the transaction has been committed, the transaction manager 905 may request permission to change the state of the transaction to the nonexistent state.

If the transaction freeze manager 925 receives a transaction manager pause request from an administrative entity, it may withhold transaction state transition permission from the transaction manager. Should this occur while a transaction is in the active state, application 903 may continue to access data sources and transaction manager 905 may continue to enlist the corresponding resource managers 907 as participants in the transaction. Therefore, the application will continue normal execution of the transaction until the commit command is executed, requiring a change of state in the transaction.

Large networked computer systems may include a plurality of application servers coupled to a wide variety of client systems and backend systems. The application servers running transaction-oriented applications may each include a transaction manager and means for pausing the transaction manager while continuing to execute non-transaction related functions as usual. This functionality may further include the capability to resume the transaction manager and the transactions that it was coordinating at the time it was paused to allow them to complete normally.

Figure 10:
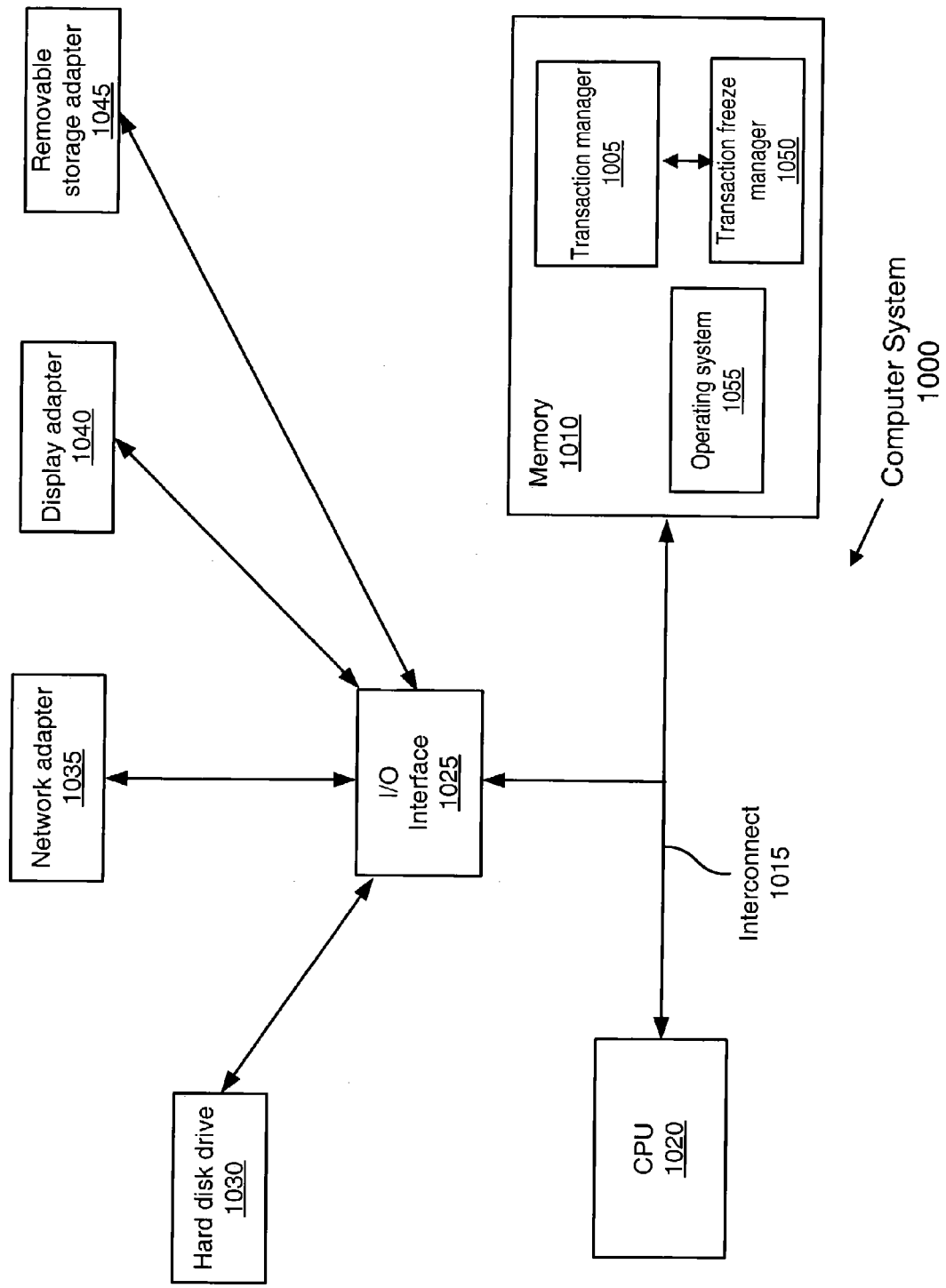
FIG. 10 illustrates the components of an exemplary computer system, according to one embodiment.

FIG. 10 illustrates one embodiment of a computer system 1000 that may include a transaction freeze manager 1050 that is able to pause a transaction manager 1005. Computer system 1000 may include many different components such as memory 1010, a central processing unit (CPU) or processor 1020, and an input/output (I/O) interface 1025. Interconnect 1015 is relied upon to communicate data from one component to another. For example, interconnect 1015 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1000 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1030, or optical storage. The memory medium may include other types of memory as well, or combinations thereof. In addition, the memory medium may be located in a first computer in which the programs are executed, or may be located in a second different computer, which connects to the first computer over a network through network adapter 1035. In the latter instance, the second computer provides the program instructions to the first computer for execution.

Also, the computer system 1000 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1010 may store program instructions accessed by the CPU 1020. For example, instructions and data implementing a transaction freeze manager 1050 that is able to pause a transaction manager 1005 may be stored in memory 1010. An operating system 1055 may also be stored in memory 1010.

Computer system 1000 may further include other software and hardware components, such as an input/output (I/O) interface 1025, that may be coupled to various other components and memory 1010. The CPU 1020 may acquire instructions and/or data through the I/O interface 1025. Through the I/O interface 1025, the CPU 1020 may also be coupled to one or more I/O components. As illustrated, 10 components may include a hard disk drive 1030, a network adapter 1035, a display adapter 1040 and/or a removable storage adapter 1045. Some components 1030 to 1045 may be coupled to the I/O interface 1025. In addition, the computer system 1000 may include one or more of a particular type of component. The computer system 1000 may include one or more components coupled to the system through a component other than the I/O interface 1025. Some computer systems may include additional and/or other components than shown in FIG. 10 such as application software (e.g., stored in memory 1010), other CPUs, video monitors or other displays, track balls, mice, keyboards, printers, plotters, scanners, or other types of I/O devices for use with computer system 1000.

Various embodiments may further include receiving, sending, or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or wireless link.

Note that the flow charts described herein represent exemplary embodiments of methods. The methods may be implemented in software, hardware, or a combination thereof. The order of method may be changed, and various elements may be added, reordered, combined, omitted or modified.

Various modifications and changes may be made to the invention as would be obvious to a person skilled in the art having the benefit of the disclosure. It is intended that that the following claims be interpreted to embrace all such modifications and changes and, accordingly, the specifications and drawings are to be regarded in an illustrative rather than a restrictive sense.

We claim:

1. A system, comprising:
one or more processors;
memory coupled to the one or more processors and configured to store program instructions executable by the one or more processors to implement a transaction manager, wherein the transaction manager is configured to:
  manage a plurality of transactions initiated by one or more applications, wherein each transaction comprises a plurality of operations to one or more data sources that are required to be committed to the one or more data sources atomically for each respective transaction;
  pause currently executing ones of the plurality of transactions managed by the transaction manager in response to a pause request to pause the transaction manager, wherein while paused, the transaction manager does not allow any of the plurality of transactions managed by the transaction manager to complete;
  allow the execution of each of the plurality of transactions managed by the transaction manager within a respective current state while the transaction manager is paused; and
  resume execution of the paused ones of the plurality of transactions managed by the transaction manager in response to a resume request.

2. The system as recited in claim 1, wherein the transaction manager is configured to change the state of each of the plurality of transaction managed by the transaction manager.

3. The system as recited in claim 2, wherein the transaction manager is configured to request permission to change the state of each of the plurality of transactions managed by the transaction manager prior to changing the state of each respective transaction.

4. The system as recited in claim 3, wherein the transaction manager is configured to wait for permission to change the state of each of the plurality of transactions managed by the transaction manager.

5. The system as recited in claim 1, wherein the transaction manager is configured to prohibit a change of state of each of the plurality of transactions managed by the transaction manager while the transaction manager is paused.

6. The system as recited in claim 1, wherein the system is configured to continue the execution of the one or more applications while the transaction manager is paused, except for changing of transaction states.

7. The system as recited in claim 1, wherein while the transaction manager is paused, the system is configured to perform operations on one or more individual transactions.

8. The system as recited in claim 7, wherein the operations comprise one or more from the following: rollback, abort, partial rollback, add/remove participant, and commit.

9. The system as recited in claim 1, wherein one or more of the transactions are local transactions.

10. The system as recited in claim 9, wherein while paused, the transaction manager is not allowed to change the state of the one or more transactions to the committing state.

11. The system as recited in claim 1, wherein one or more of the transactions are global transactions.

12. The system as recited in claim 11, wherein while paused, the transaction manager is not allowed to change the state of the one or more transactions to the preparing state nor to the committing state.

13. A system, comprising:
one or more processors; and
memory coupled to the one or more processors and configured to store program instructions executable by the one or more processors to implement one or more application servers, wherein each one or more application servers is configured to:
run one or more applications each configured to initiate one or more transactions, wherein each of the one or more transactions comprises a plurality of operations to one or more data sources that are required to be committed to the one or more data sources atomically for the transaction; and
provide one or more transaction managers configured to manage the one or more transactions initiated by the one or more applications, wherein one of the one or more transaction managers is configured to:
pause one or more of the one or more currently executing transactions in response to a pause request, wherein the one of the one or more transaction managers does not allow the one or more transactions that have been paused to complete while paused;
allow the execution of the one or more transactions that have been paused within a respective current state while paused; and
resume one or more of the one or more transactions that have been paused in response to a resume request.

14. A computer-implemented method, comprising:
using one or more computers to perform:
generating a request to pause a transaction manager;
pausing the transaction manager in response to said request, wherein while the transaction manager is paused, transactions currently executing and managed by the transaction manager are prohibited from completing, wherein the transactions are initiated by one or more applications;
allowing the execution of the transactions managed by the transaction manager within a respective current state while the transaction manager is paused:
generating a request to resume the transaction manager; and
resuming the transaction manager in response to said request, wherein when the transaction manager is resumed, paused transactions managed by the transaction manager are allowed to complete, wherein each transaction managed by the transaction manager comprises a plurality of operations to one or more data sources that are required to be committed to the one or more data sources atomically for each respective transaction.

15. The method as recited in claim 14, wherein said pausing comprises prohibiting the transaction manager from changing the state of the transactions, wherein the transaction manager attempts to perform a state change on a transaction in response to input to the transaction manager.

16. The method as recited in claim 15, wherein the input comprises notification that an application has initiated a transaction.

17. The method as recited in claim 16, wherein said state change comprises a change from a nonexistent state to an active state.

18. The method as recited in claim 15, wherein the input comprises notification that an application has executed a commit transaction command.

19. The method as recited in claim 18, wherein said state change comprises a change from an active state to a preparing state.

20. The method as recited in claim 15, wherein the input comprises notification that all participants are prepared commit the transaction.

21. The method as recited in claim 20, wherein said state change comprises a change from a preparing state to a committing state.

22. The method as recited in claim 15, wherein the input comprises notification that all participants have committed the transaction.

23. The method as recited in claim 22, wherein said state change comprises a change from a committing state to a nonexistent state.

24. The method as recited in claim 15, further comprising, while the transaction manager is paused, continuing to support the execution of the one or more applications, except for the changing of transaction states.

25. A computer-readable storage medium storing program instructions, wherein the program instructions are computer-executable to:
generate a request to pause a transaction manager;
pause a plurality of transactions managed by the transaction manager in response to said request to pause the transaction manager, wherein while the transaction manager is paused, the plurality of currently executing transactions managed by the transaction manager are prohibited from completing, wherein the plurality of transactions are initiated by one or more applications, wherein each transaction comprises a plurality of operations to one or more data sources that are required to be committed to the one or more data sources atomically for each respective transaction;
allow the execution of each of the plurality of transactions managed by the transaction manager within a respective current state while the transaction manager is paused;
generate a request to resume the transaction manager; and
resume the plurality of transactions managed by the transaction manager in response to said resume request, wherein when the transaction manager is resumed, the plurality of paused transactions managed by the transaction manager are allowed to complete.

26. The computer-readable storage medium as recited in claim 25, wherein the program instructions are computer-executable to pause the transaction manager by prohibiting the transaction manager from changing the state of any of the plurality of transactions managed by the transaction manager, wherein the transaction manager attempts to perform a state change on a transaction in response to input to the transaction manager.

27. The computer-readable storage medium as recited in claim 26, wherein the input comprises notification that an application has initiated a transaction.

28. The computer-readable storage medium as recited in claim 27, wherein said state change comprises a change from a nonexistent state to an active state.

29. The computer-readable storage medium as recited in claim 26, wherein the input comprises notification that an application has executed a commit transaction command.

30. The computer-readable storage medium as recited in claim 29, wherein said state change comprises a change from an active state to a preparing state.

31. The computer-readable storage medium as recited in claim 26, wherein the input comprises notification that all participants are prepared commit the transaction.

32. The computer-readable storage medium as recited in claim 31, wherein said state change comprises a change from a preparing state to a committing state.

33. The computer-readable storage medium as recited in claim 26, wherein the input comprises notification that all participants have committed the transaction.

34. The computer-readable storage medium as recited in claim 33, wherein said state change comprises a change from a committing state to a nonexistent state.

35. The computer-readable storage medium as recited in claim 26, wherein the program instructions are computer-executable to, while the plurality of transactions managed by the transaction manager is are paused, continue to support the execution of the one or more applications, except for the changing of transaction states.

* * * * *

UNITED STATES PATENT AND TRADEMARK OFFICE
CERTIFICATE OF CORRECTION

PATENT NO.       : 7,640,545 B2                              Page 1 of 1
APPLICATION NO. : 10/618828
DATED            : December 29, 2009
INVENTOR(S)      : Kumar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1931 days.

Signed and Sealed this

Ninth Day of November, 2010

David J. Kappos
*Director of the United States Patent and Trademark Office*